Feb. 27, 1962 P. C. GARDINER ETAL 3,022,760
ECHO RANGE LIMITATION EQUIPMENT
Filed Oct. 4, 1950

INVENTORS
PAUL C. GARDINER
LAWRENCE E. JEWETT
GEORGE LUPTON BROOMELL, Jr

ATTORNEY

3,022,760
ECHO RANGE LIMITATION EQUIPMENT
Paul C. Gardiner, Scotia, N.Y., and Lawrence E. Jewett, Springfield, and George Lupton Broomell, Jr., Lower Gwynedd Township, Pa., assignors, by direct and mesne assignments, to the United States of America as represented by the Secretary of the Navy
Filed Oct. 4, 1950, Ser. No. 188,469
6 Claims. (Cl. 114—23)

The invention relates to improvements in underwater compressional wave echo signalling systems and more specifically to improved systems provided with means for limiting their effective range as a function of transducer pitch angle and water depth.

When using echo ranging gear in shallow water or with the transducer downwardly pitched, it is frequently necessary to limit the range of the equipment in order to avoid bottom reflections.

In shipboard use of echo ranging equipment using a nontilting sound head, the permissible range at a given transducer beam width varies with water depth which may be readily measured. On an echo controlled torpedo or similar device having no provision for measuring distance to the bottom, depth below the surface is an easy and practical measure of maximum permissible range. It is also possible to preset for the initial water depth so that the range may be kept at an absolute maximum.

On shipboard equipment using a tilting sound head and also on an echo controlled torpedo, the angle of the transducer from the horizontal is of major importance. Permissible range at a given water depth is a function of this angle.

In all echo ranging equipment, time is used to measure range. Reduction of range may therefore be accomplished by blanking operation of the echo receiver after a preset time during each operating cycle.

An important object of the present invention is to provide means automatically limiting the effective range of an echo receiver as a function of water depth.

Another object of the invention is the provision of means automatically limiting the effective range of an echo receiver as a function of the transducer pitch angle.

A further object is to provide means automatically limiting the effective range of an echo receiver as a function of water depth and transducer pitch angle.

Other objects and advantages of the invention will become apparent during the course of the following detailed description, taken in connection with the accompanying drawing, forming a part of this specification, and in which drawing.

Figure 1:
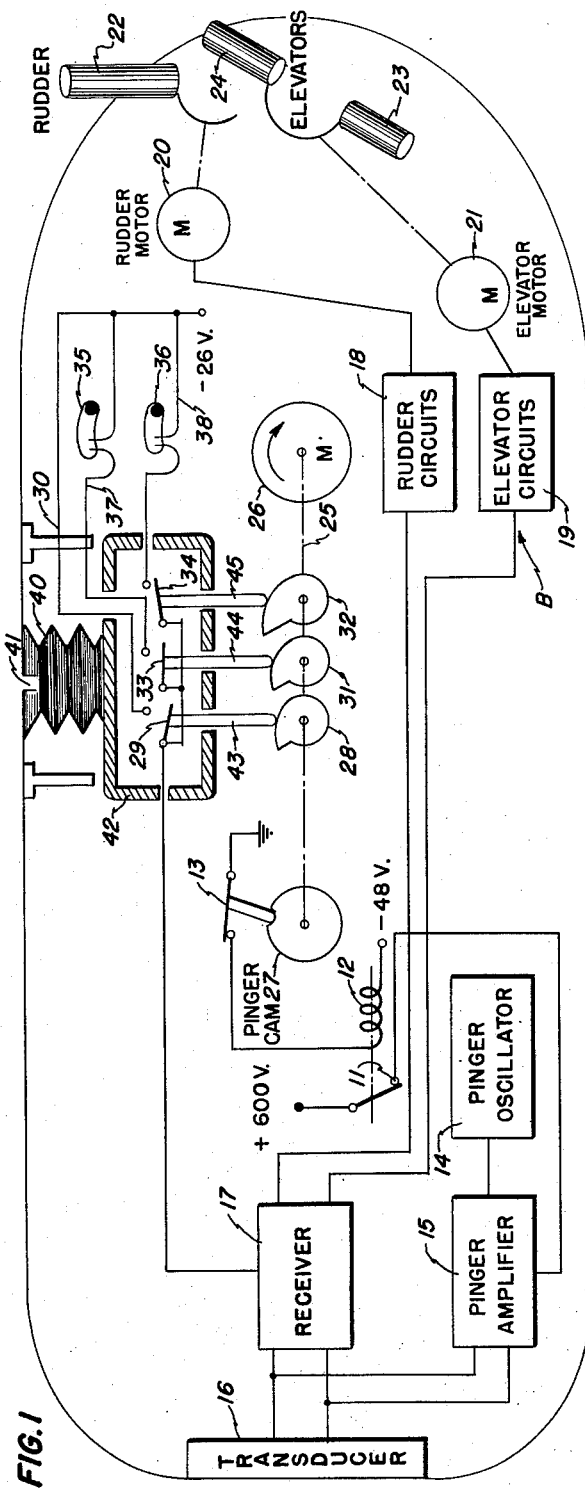
FIG. 1 is an electromechanical diagrammatic view of an echo controlled torpedo equipped with an automatic range limiting system.

In the drawing, which for the purpose of illustration shows different forms of the invention, and wherein similar reference characters denote correpsonding parts throughout the views, the letter A in FIG. 1 designates a torpedo equipped with an echo controlled steering system B. Under the control of contact 11 of a pinger relay 12 energized upon closing of a pinger switch 13, pulses or pings of 60-kc. voltage and 30-milliseconds' duration are generated and amplified by a pinger oscillator 14 and amplifier 15. These pulses or pings are projected underwater every 0.8 second by a transducer 16 and, if there is a target present within range, are reflected back as echoes. Upon reaching the transducer, these echoes are translated into electrical input signals which are processed by a receiver 17 which acts as interpreter and disseminator of information and is adapted to supply control signals to rudder and elevator circuits 18, 19 including motors 20, 21 for setting the rudder 22 and elevators 23, 24 respectively.

Fixed on a shaft 25 turned at a constant speed by a motor 26 is a pinger cam 27 controlling periodic closing of the pinger switch 13. Also fixed on the same shaft is a timer cam 28 adapted to cause intermittent closing of a range reducing switch 29 in a receiver blanking circuit 30 adapted, when closed, to apply —26 volts to the receiver 17. The blanking action is accomplished by utilizing this negative voltage to bias one or more receiver amplifier stages beyond cut off. Inasmuch as the timer cam 28 is driven at a constant speed by the same shaft that turns the pinger cam 27, it is possible to so shape the range cam that its associated switch 29 will close the receiver blanking circuit 30 upon the expiration of a predetermined time following operation of the pinger switch 13 and thereby limit the effective range of the echo controlled steering system. The cam may, for instance, be designed for a 2000 foot range limitation.

Fixed on the same shaft 25 are two additional timer cams 31, 32 adapted to cause intermittent closing of range reducing switches 33, 34 serially connected with pitch-controlled mercury switches 35, 36 in receiver blanking circuits 37, 38. When closed, these circuits apply —26 volts to the receiver so as to blank its operation. The cams 31, 32 may, for instance, be designed for 1500 foot and 1000 foot range limitations and the mercury switches 35, 36 may be adapted to close when the pitch exceeds 6° and 9°, respectively.

Mounted within the torpedo is a bellows 40 whose interior is subjected to ambient hydrostatic pressure through an opening 41 in the torpedo shell. Attached to the free end of the bellows is a housing 42 carrying the range reducing switches 29, 33, 34 in spaced relation to the timer cams 28, 31, 32. Suitable lift pins 43–45 ride on the cams and extend through the housing to operate the range reducing switches. An increase in torpedo depth will result in elongation of the bellows and displacement of the range reducing switches 29, 33, 34 toward the timer cams. This action shortens the throw required for closing the switches and further reduces the range of the receiver.

From the foregoing, it is clear that cam 28 provides range reduction commensurate with depth regardless of pitch angle, that cam 31 provides further range reduction with increase in depth if the pitch exceeds the 6° setting of its associated mercury switch, and that cam 32 provides still further range reduction if the pitch exceeds the 9° setting of its associated mercury switch.

Figure 2:
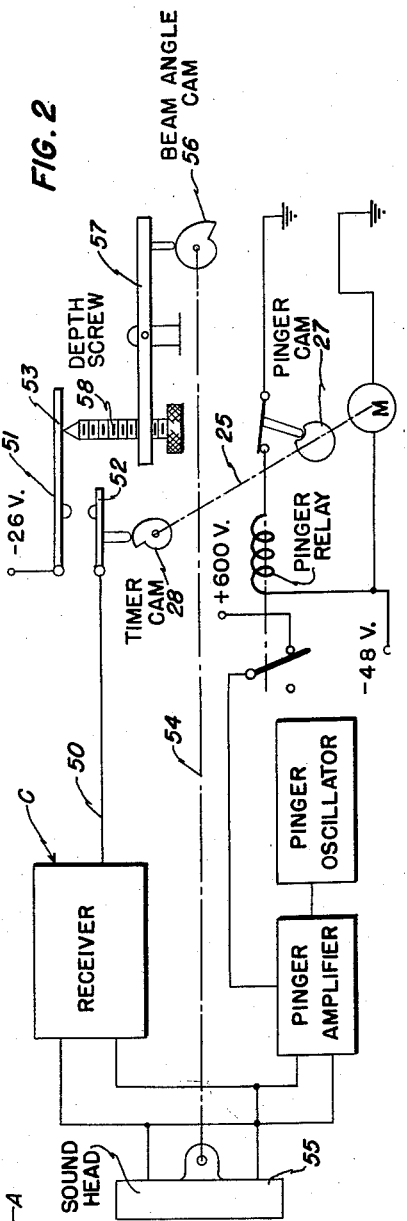
FIG. 2 is an electromechanical diagrammatic view of echo ranging gear including a tilting transducer and a semiautomatic range limiting system.

Referring now to FIG. 2 which shows a range reduction system for echo ranging equipment C used on surface vessels, the shaft 25 operates a timer cam 28 synchronously with a pinger cam 27, as in FIG. 1. Connected in a receiver blanking circuit 50 is a range reducing switch 51 comprising two relatively movable pivoted contact arms 52, 53. The position of arm 52 is controlled by the timer cam 28.

Any suitable connection 54 transmits motion commensurate with angular displacement of a pivoted sound head 55 to a beam angle cam 56. The position of this beam angle cam is transmitted through a pivoted arm 57 and a depth screw 58 to the other contact arm 53 of the range reducing switch.

In using the equipment shown in FIG. 2, water depth is determined by any suitable method and the maximum allowable range for the ascertained depth is set by manual adjustment of the depth screw 58. An increase in downward pitch of the sound head causes rotation of the beam angle cam 56 and of arm 57 in a direction to lower the depth screw 58. This action shortens the throw required for closing the contact arms 52, 53. From the foregoing description, it is clear that the range of the receiver is automatically reduced upon downward tilting of the sound head 55, and that its range may be manually adjusted to compensate for variations in water depth.

If a nontilting sound head is used, the beam angle cam 56 may be omitted. The maximum allowable range is then set by manual adjustment of the depth screw 58. The permissible range at a given depth is a function of the transducer beam width.

The effective range of either of the echo signalling systems described herein may be reduced by electronic means using condenser discharge, charge, or other time constant relations to measure time.

Various changes may be made in the forms of invention herein shown and described without departing from the spirit of the invention or the scope of the following claims.

What is claimed is:

1. In an echo signaling system of the character described, a transmitter for projecting acoustic waves underwater at any one of a plurality of angles of depression during at least one stage in its operation, control means adapted to effect operation of said transmitter during spaced transmission periods separated by listening intervals, a receiver adapted to translate echoes of said projected acoustic waves, upon reception, into electrical signals, means for blanking operation of said receiver upon the expiration of a time length following each transmission period so as to limit the effective range of the system, and means coacting with said receiver blanking means adapted to vary said time length as an inverse function of depth of the transmitter.

2. In an echo signaling system of the character described, a transmitter for projecting an acoustic beam underwater at any one of a plurality of angles of depression relative to the horizontal during at least one stage of its operation, control means adapted to effect operation of said transmitter during spaced transmission periods separated by listening intervals, a receiver adapted to translate echoes of said projected acoustic waves, upon reception, into electrical signals, means for blanking operation of said receiver upon the expiration of a time length following each transmission period so as to limit the effective range of the system, a first means coacting with said receiver blanking means adapted to vary said time length as an inverse function of depth of the transmitter, and a second means coacting with said receiver blanking means adapted to vary said time length inversely of variations in the angle of depression of said acoustic beam.

3. In an echo controlled system for steering a torpedo toward a target, a transmitter for projecting acoustic waves ahead of the torpedo at any one of a plurality of angles of depression during at least one stage in its operation, control means adapted to effect operation of said transmitter during spaced transmission periods separated by listening intervals, a receiver adapted to translate echoes of said projected acoustic waves, upon return from said target, into steering control signals, means for blanking operation of said receiver upon the expiration of a time length following each transmission period so as to limit the effective range of the system, said receiver blanking means being disabled during substantially horizontal disposition of said torpedo, means enabling said receiver blanking means when the pitch of the torpedo exceeds a predetermined angle of depression, and means coacting with said receiver blanking means to vary said time length inversely of variations in torpedo depth.

4. In an echo controlled system for steering a torpedo toward a target, a transmitter for projecting acoustic waves ahead of the torpedo at any one of a plurality of angles of depression during at least one stage in its operation, control means adapted to effect operation of said transmitter during spaced transmission periods separated by listening intervals, a receiver adapted to translate echoes of said projected acoustic waves, upon return from said target, into steering control signals, a plurality of devices for blanking operation of said receiver so as to limit the effective range of the system, one of said devices being adapted to blank said receiver upon the expiration of a predetermined time length and a second upon the expiration of a shorter time length, said second blanking device being normally disabled, a component enabling said second blanking device when the pitch of the torpedo exceeds a predetermined angle of depression, and means coacting with said plurality of devices to vary said time lengths directly with variations in torpedo depth.

5. In an echo controlled system for steering a torpedo toward a target, a transmitter adapted to project acoustic waves ahead of the torpedo at any one of a plurality of angles of depression during at least one stage in its operation, control means adapted to effect operation of said transmitter during spaced transmission periods separated by listening intervals, a receiver adapted to translate echoes of said projected acoustic waves, upon return from said target, into steering control signals, a plurality of devices for blanking operation of said receiver upon the expiration of different time lengths following each transmission period so as to limit the effective range of the system, said receiver blanking devices being normally disabled, separate components enabling said individual receiver blanking devices each when the pitch of the torpedo exceeds a different angle of depression, and means coacting with said receiver blanking devices to vary said time length directly with variations in torpedo depth.

6. In an echo controlled system for steering a torpedo toward a target, a transmitter adapted to project acoustic waves ahead of the torpedo at any one of a plurality of angles of depression during at least one stage of its operation, control means adapted to effect operation of said transmitter during spaced transmission periods separated by listening intervals, a receiver adapted to translate echoes of said projected acoustic waves, upon return from said target, into steering control signals, means for blanking operation of said receiver upon the expiration of a time length following each transmission period so as to limit the effective range of the system, and hydrostatic pressure responsive means coacting with said receiver blanking means adapted to vary said time length directly with variations in torpedo depth.

References Cited in the file of this patent

UNITED STATES PATENTS

| | | |
|---|---|---|
| 2,409,632 | King | Oct. 22, 1946 |
| 2,442,695 | Koch | June 1, 1948 |